S. G. MEEKER.
LOCK NUT.
APPLICATION FILED MAY 9, 1910.

1,045,423.

Patented Nov. 26, 1912.

Witnesses
J. G. Stinkel
B. C. Rust

Inventor
Samuel G. Meeker
By
Foster, Freeman, Watson & Coit
Attorneys

UNITED STATES PATENT OFFICE.

SAMUEL G. MEEKER, OF NEW YORK, N. Y.

LOCK-NUT.

1,045,423. Specification of Letters Patent. Patented Nov. 26, 1912.

Application filed May 9, 1910. Serial No. 560,242.

*To all whom it may concern:*

Be it known that I, Samuel G. Meeker, a citizen of the United States, and resident of the borough of Manhattan, city of New York, county and State of New York, have invented certain new and useful Improvements in Lock-Nuts, of which the following is a specification.

This invention relates to means for preventing nuts from being accidentally unscrewed.

The novel features of construction will be apparent from the following description, taken in connection with the accompanying drawings.

Figure 1:
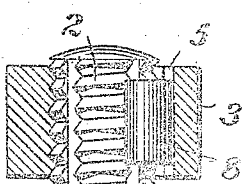
Figure 3:
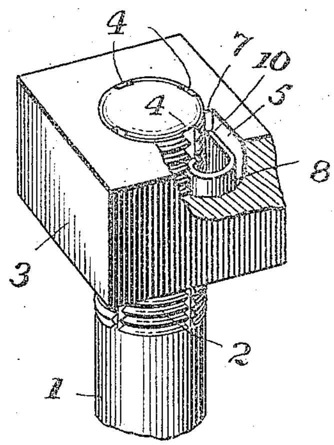
Figure 4:
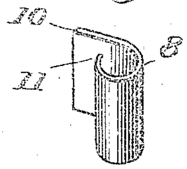
Figure 2:
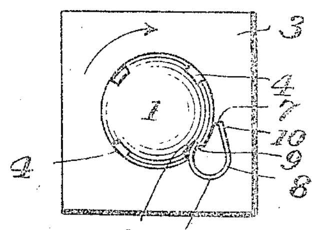

In the drawings,—Figure 1 is a side view partly in section of a nut and bolt having my invention applied thereto; Fig. 2 is a plan view of the construction shown in Fig. 1; Fig. 3 is a perspective view partly broken away showing my spring detent in place; Fig. 4 is a perspective view of the spring detent removed from the nut; and Fig. 5 is a plan view showing a modified form of spring detent in place on the nut.

In these drawings I have shown a bolt 1 provided with the screw threads 2 upon which the nut 3 fits. The bolt 1 may also be provided with the longitudinal grooves 4 which coöperate with my spring detent to assist in preventing rotation of the nut when not desired, but it will be understood that these grooves are not always necessary. The nut 3 is provided with a longitudinal opening 5 which is circular in cross section throughout most of its circumference, and which is parallel with the central screw threaded opening of the nut and intersects that central opening. This opening 5 is formed with a notch or extension on one side, the outer surface of which is substantially tangent to the circular portion of the opening, and it extends inwardly toward the central screw-threaded opening leaving a shoulder 7 at the end. It will be observed that this opening 5 is entirely within the outer margin of the nut and extends longitudinally through it. In this opening 5 I place a spring detent 8 which is preferably formed of a flat sheet of metal, curved at one end to conform to the shape of the opening, thus forming at that end a tube-like spring. The inner end 9 of the tube-like portion extends normally within the central screw-threaded opening, so as to bear by its spring action upon the bolt which enters that opening. In the forms shown in Figs. 1 and 2, this end terminates at such a point that the edge will be in contact with the threads on the bolt, and may enter the longitudinal grooves 4 so as to lock the nut positively against rotation in one direction on the bolt, while permitting it to rotate under the application of force in the other direction. The opposite end 10 of this detent is extended at practically a tangent to the tubular portion and is adapted to bear against the shoulder 7, and it will be observed that by this shape of the spring and the opening in which it fits closely I have provided means for preventing the tubular portion of the spring from rotating in the opening, and thus always make the portion of the spring desired bear against the threads of the bolt. It will be observed that when the nut is turned in the direction indicated by the arrow in Fig. 2 the end 9 of the spring detent will be forced outward from the central screw-threaded opening to the opening 5, and thus the nut may be turned without exerting great force. When the effort is made however to turn it in the opposite direction, the end 9 engaging the grooves 4 or other irregularities on the surface of the threads will prevent the turning of the nut because the tubular portion closely fits the opening and can not be turned or expanded in that direction. The contact of the end 10 with the shoulder 7 or with the outer surface of the screw threads 2 will prevent the turning of the spring.

Figure 5:
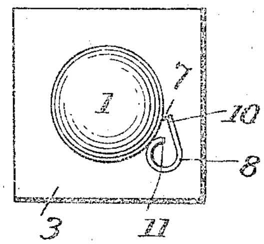

In the form shown in Figs. 4 and 5 the end 11 of the tubular portion of the spring is extended in the arc of a circle farther than in the form shown in Fig. 2, and it is extended so far that the edge of the spring will not make contact with the threads of the bolt, but on the contrary the threads will engage the cylindrically curved portion which tapers in each direction from the point of contact. In this form therefore the nut is not positively locked against rotation in either direction, and upon the exercise of sufficient force it may be turned on or off, notwithstanding the presence of the spring detent. The spring in this case however serves as a sufficient detent against rotation to prevent any accidental movement of the nut. In this case as well as in the form shown in Fig. 2 the spring detent is prevented from rotating and becoming displaced by the extension from the tubular portion engaging the notch in the opening in which it fits. In both forms shown there is a partially closed tube with the extension to prevent rotation. By having the opening 5 extend through the nut from side to side an inexpensive construction having many obvious advantages is produced.

Having thus described the invention, what is claimed is:—

1. A nut having entirely inside of its outer circumference, a recess extending therethrough which is parallel with and adjoining the threaded opening for the bolt, and a detent protruding from a spring supported in said recess, and saliently or convexly formed relative to the opening for the bolt in both directions on opposite sides of a line radial to the nut, said protuberant portion being adapted to contact with a threaded bolt in engagement with the threaded portion of the nut, and means for preventing said spring and detent from turning in said recess.

2. A nut having an opening extending therethrough and parallel with, but wholly at one side of the central threaded opening of the nut, the said openings intersecting each other, a compressible spring supported in the first mentioned opening having at one edge a tube-like portion, the side of which is adapted to bear against a bolt entering said central opening at the point of intersection of said openings, and having at its other edge means for engaging the nut within said opening to prevent rotation of the spring.

3. A nut having an opening parallel with but wholly at one side of the central threaded opening of the nut, the said openings intersecting each other and the first mentioned opening being circular in cross section at one edge and tapering to the central opening at the other edge, and a spring closely fitting said first mentioned opening and having its end curved and having its side adapted to engage a bolt entering said central opening at the point of intersection of said openings.

4. A nut having an opening extending therethrough and parallel with but wholly at one side of the central threaded opening of the nut, the said openings intersecting each other and the first mentioned opening being circular in cross section throughout most of its circumference but having a notch or extension on one side, and a spring closely fitting said first mentioned opening having its end convexly curved relative to the central threaded opening and extended to engage a bolt entering said central opening at the point of intersection of said openings and having a portion entering said notch or extension to prevent rotation of said spring.

5. A nut having an opening extending through its body from side to side parallel with the axis of the nut and intersecting the central threaded portion thereof, said opening being circular in cross-section at one edge and having its other edge extended substantially tangent to the circular portion and the central threaded opening, a compressible sheet metal spring closely fitting said opening and having its circular end extended so as to present a convex surface to said central threaded opening.

In testimony whereof I affix my signature in presence of two witnesses.

SAMUEL G. MEEKER.

Witnesses:

WALTER SCHULZ,
WM. MEAD.